United States Patent [19]

Wittes

[11] 4,451,713

[45] May 29, 1984

[54] PUSHBUTTON LOCK

[76] Inventor: James M. Wittes, 40 Palisade Rd., Linden, N.J. 07036

[21] Appl. No.: 231,494

[22] Filed: Feb. 4, 1981

[51] Int. Cl.³ ............................................. H04M 1/66
[52] U.S. Cl. ............................ 179/189 D; 179/189 R; 70/DIG. 72
[58] Field of Search ....................... 179/189 R, 189 D; 70/164, 163, 162, DIG. 72

[56] References Cited

U.S. PATENT DOCUMENTS

| | | | |
|---|---|---|---|
| 3,624,317 | 11/1971 | Buckingham | 179/189 R |
| 3,866,000 | 2/1975 | Gillis . | |
| 3,899,647 | 12/1975 | Nachsi et al. . | |
| 4,028,508 | 6/1977 | Hall . | |
| 4,081,630 | 3/1978 | Washburn et al. | 179/189 R |
| 4,131,769 | 12/1978 | Davis . | |
| 4,297,539 | 10/1981 | Fairbanks | 179/189 D |
| 4,304,971 | 12/1981 | Flax | 179/189 D |
| 4,323,739 | 4/1982 | Flax et al. | 179/189 D |

FOREIGN PATENT DOCUMENTS 2812540  9/1979  Fed. Rep. of Germany ... 179/189 D

OTHER PUBLICATIONS

IBM Technical Disclosure Bulletin, vol. 20, No. 11A—Apr. 1978, "Keyboard Lock Mechanism" by R. G. Duranske (pp. 4516-4517).

Primary Examiner—Harold I. Pitts
Assistant Examiner—L. C. Schroeder
Attorney, Agent, or Firm—Curtis, Morris & Safford

[57] ABSTRACT

The pushbutton lock is used to lock one or more selected pushbuttons on a pushbutton type of telephone in order to prevent the making of unauthorized calls from that telephone. The locking of pushbuttons in other types of keysets also is described. A cover for one or more pushbuttons is secured in place by a gripping mechanism which grips at least two opposite sides of one or more of the pushbuttons when a lock cylinder is turned. The lock actuating mechanism is located vertically above the gripping mechanism so that the cover can be made small enough to fit around one or two of the pushbuttons and leave the others exposed for use, if desired.

19 Claims, 13 Drawing Figures

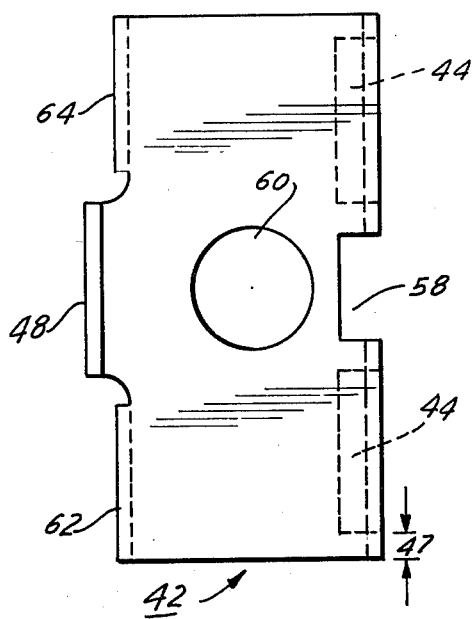
FIG. 3
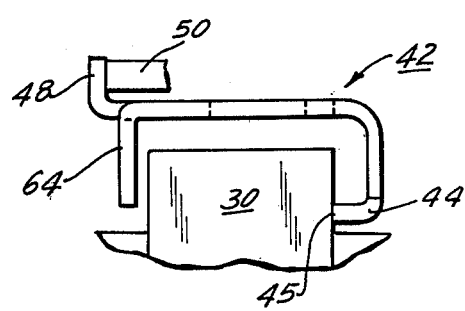
FIG. 4
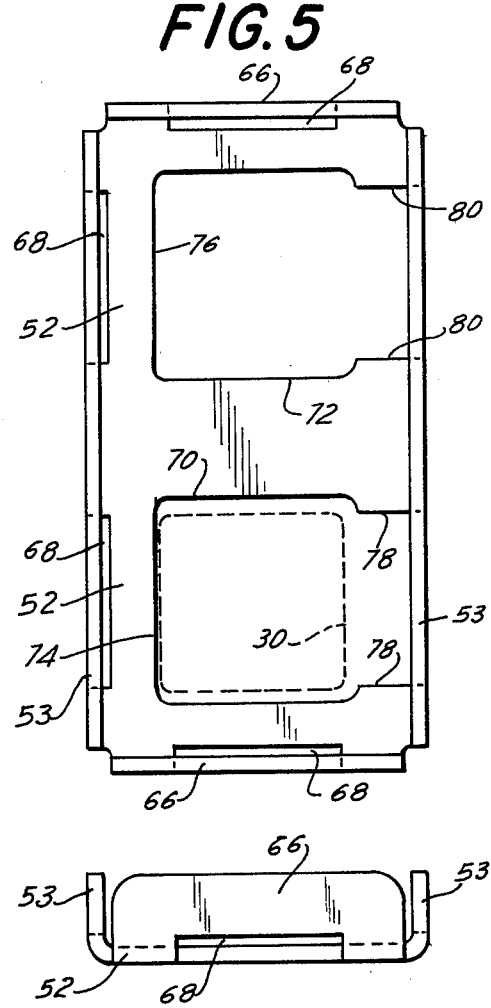
FIG. 5
FIG. 6
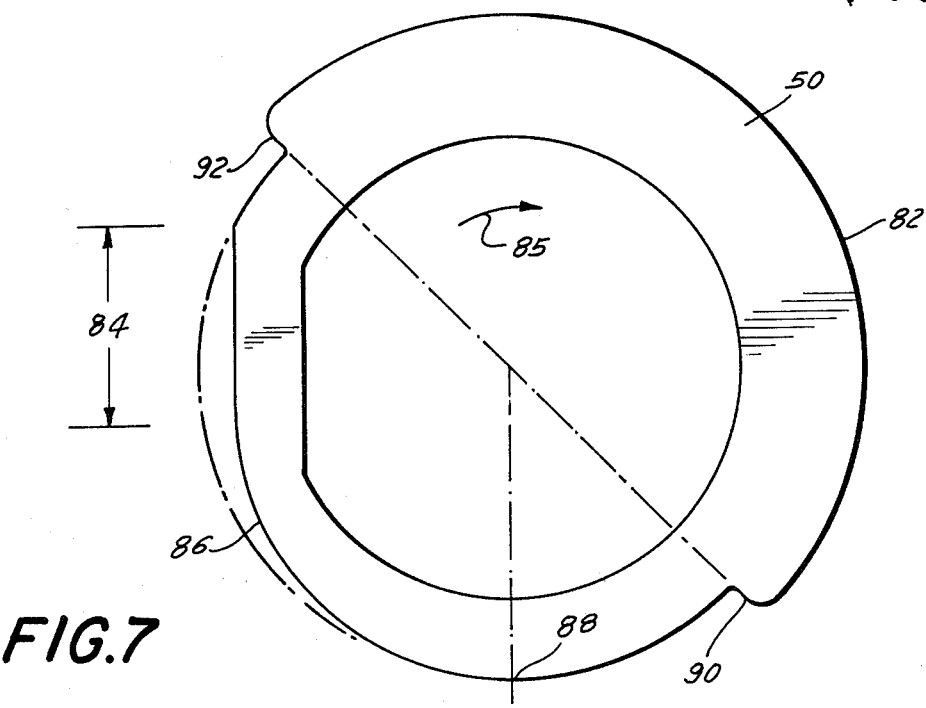
FIG. 7

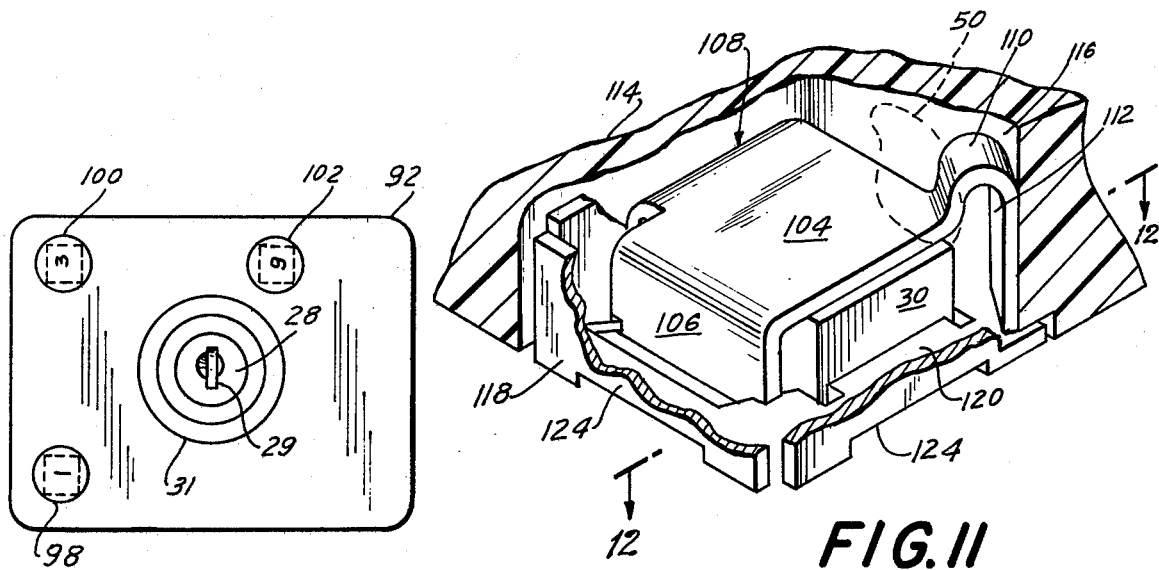
FIG. 8
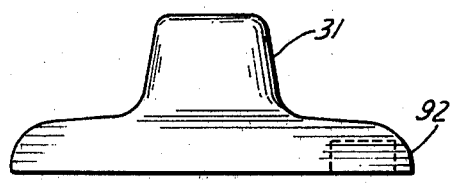
FIG. 9
FIG. 11
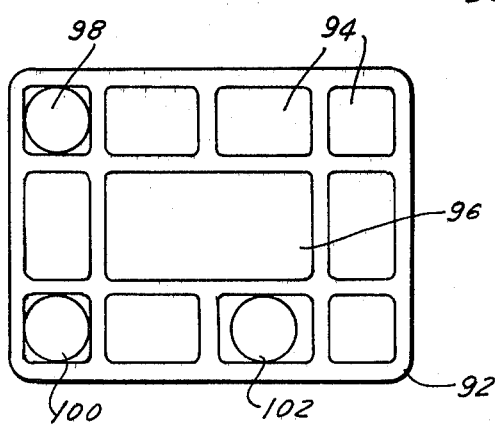
FIG. 10
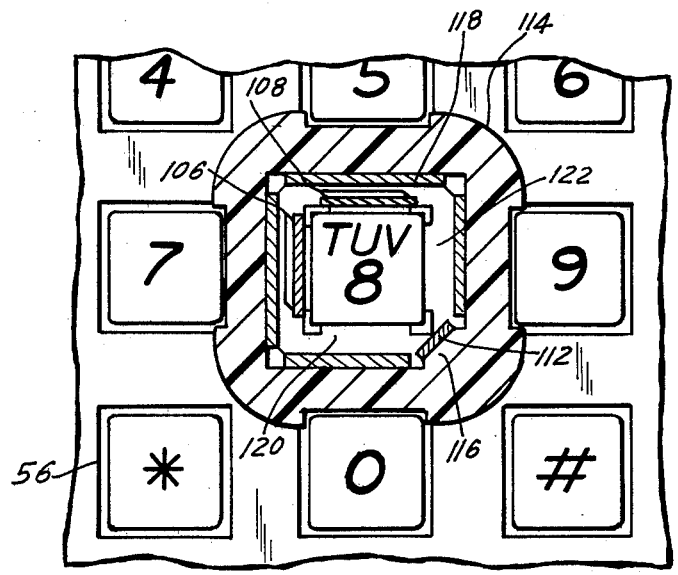
FIG. 12
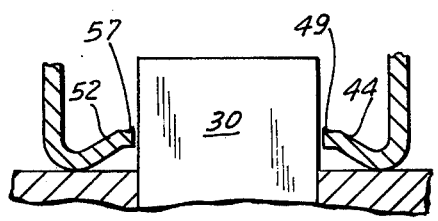
FIG. 13

PUSHBUTTON LOCK

This invention relates to devices for locking pushbuttons to prevent their operation, and specifically relates to means for locking one or more selected pushbuttons on a pushbutton type of telephone so as to prevent the making of unauthorized telephone calls from that telephone.

Various types of locks have been proposed in order to lock pushbutton arrays to prevent unauthorized operation. In particular, locks for "Touch-Tone" telephones have been proposed in the past. However, such locks generally have been relatively cumbersome, difficult to install and/or use, and relatively complex and expensive to manufacture.

Accordingly, it is an object of the present invention to provide a pushbutton locking device which is relatively simple and compact, and is relatively inexpensive to manfuacture, while being relatively secure and reliable in operation.

In accordance with the present invention, the foregoing objects are met by the provision of a pushbutton locking device which grips one or more pushbuttons in order to hold a pushbutton cover in place. A gripping mechanism is provided which grips at least two opposite sides of one or more pushbuttons. Locking means is mounted above the pushbutton and is used to cause the gripping mechanism to grip the pushbutton. This arrangement makes it possible to use the same locking device to lock a cover for all of the pushbuttons or for any number less than all of them, as desired.

Preferably, the gripping mechanism for gripping the pushbutton includes first and second gripping members movable towards and away from one another, with drive means for moving the gripping members towards and away from one another.

Preferably, at least one of the gripper members is resiliently-mounted so that pushbuttons of somewhat different sizes can be accommodated without changing the structure of the locking device.

In one embodiment of the invention, a pushbutton is gripped by the application of opposing force on four opposite sides of the pushbutton.

The locking device is relatively simple, compact and inexpensive in construction, and is relatively easy to manufacture, since close manufacturing tolerances need not be maintained. The device is extremely easy to use, since it merely need be placed over the pushbuttons and locked, and then unlocked when it is desired to use the pushbuttons again. The telephone or other pushbutton array need not be dismantled for installation purposes. Moreover, the locking mechanism is adaptable so that the same mechanism can be used to lock a variety of different covers, from a cover for a single pushbutton to a cover for a whole array of pushbuttons. Thus, the lock mechanism can be standardized in construction, regardless of the type of cover which is used. This further reduces manufacturing costs. Another advantage of the invention is that the locking device prevents outgoing calls, to the degree desired, but does not prevent the receipt of incoming calls when used on pushbutton telephones.

The foregoing and other objects and advantages of the invention will be pointed out in or be apparent from the following description and drawings. In the drawings:

FIG. 3 is a top plan view of a component of the device shown in FIGS. 1 and 2;

FIG. 4 is a front elevation view of the component shown in FIG. 3;

FIG. 5 is a top plan view of another component of the device shown in FIGS. 1 and 2;

FIG. 6 is a front elevation view of the part shown in FIG. 5;

FIG. 7 is a top plan view of a cam used in the device shown in FIGS. 1 and 2;

FIGS. 8, 9 and 10 are, respectively, top plan, front elevation, and bottom plan views of an alternative embodiment of the invention;

FIG. 11 is a perspective, partially broken away, and partially schematic view of another locking mechanism constructed in accordance with the present invention;

FIG. 12 is a cross-sectional view, taken along line 12—12, of FIG. 11, showing the device of FIG. 11 in use in a panel of pushbuttons; and FIG 13 is a partially schematic, partially broken-away view of a portion of an alternative embodiment of the invention.

GENERAL DESCRIPTION

Figure 1:
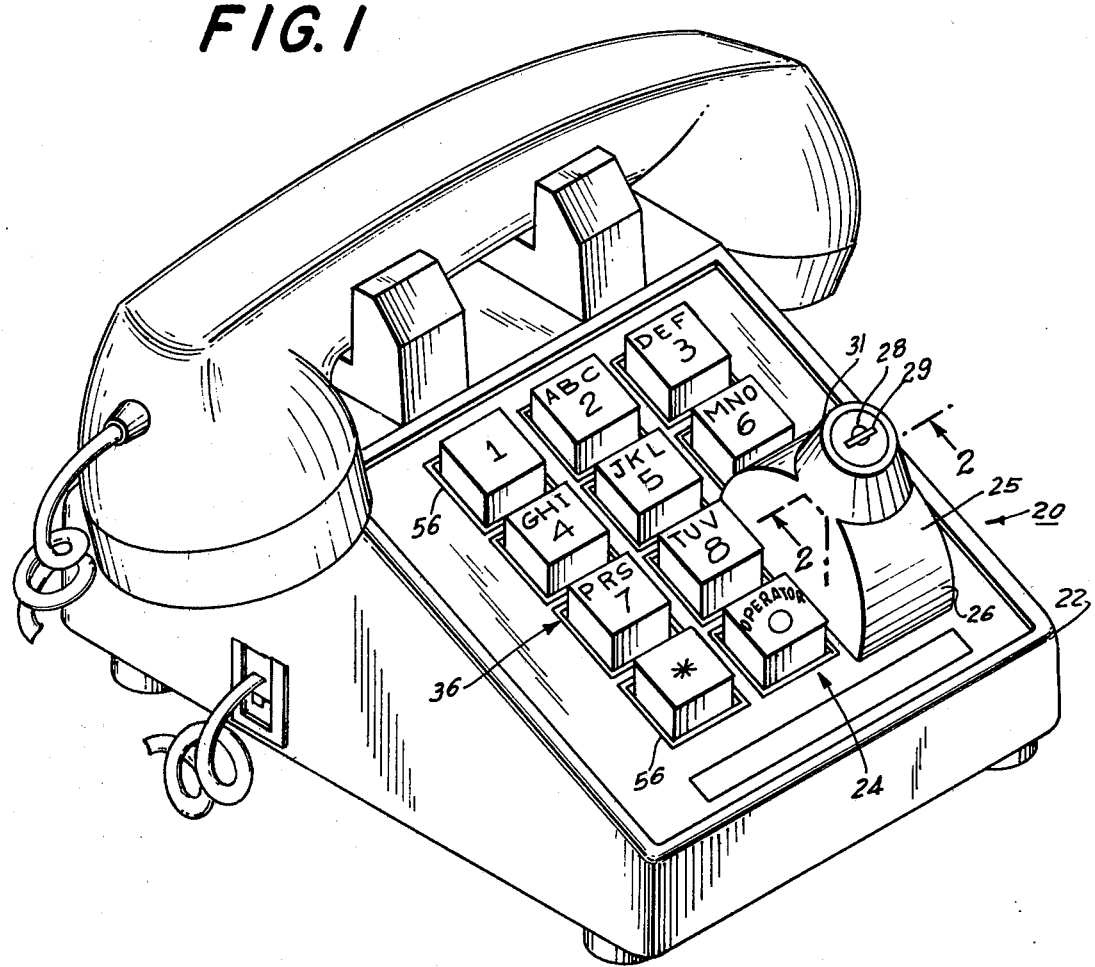
FIG. 1 is a perspective view of the locking device of the present invention in use on a pushbutton-type telephone.

FIG. 1 shows the locking device 20 of the present invention in use in locking two pushbuttons on a pushbutton or "Touch-Tone" type of telephone 22. This telephone has an array 24 of pushbutton keys for use in keying a telephone number. The pushbuttons protrude upwardly through a panel 36 of the telephone 22. This invention is useful not only with an array of pushbuttons on a telephone, but also with other arrays of pushbuttons on computer keyboards, control panels, etc.

Figure 2:
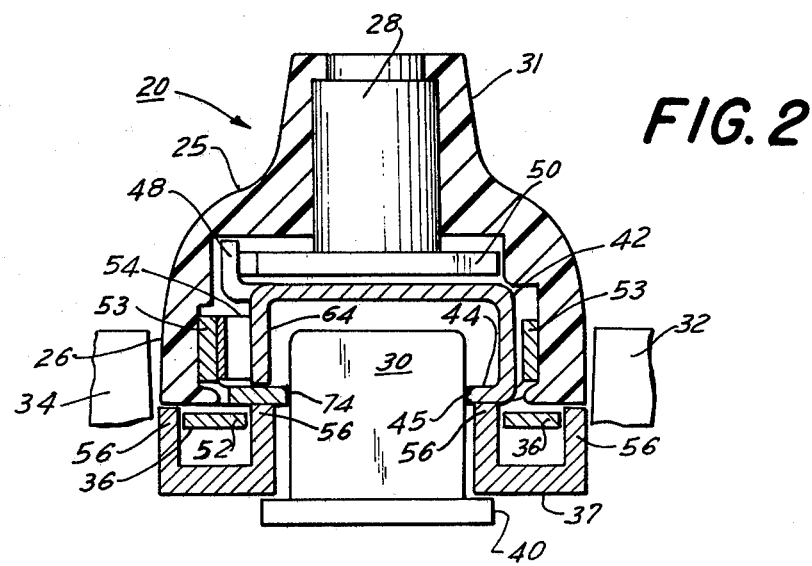
FIG. 2 is a cross-sectional view taken along line 2—2 of FIG. 1 which is a line through the center of one of the pushbuttons being gripped, and through the center of the upper portion of the cover of the lock.

Referring now to FIG. 2, as well as to FIG. 1, the locking device 20 includes a molded plastic housing 25 with a base portion 26 and an upper portion 31. Slidably-fitted into the cylindrical interior of the upper portion 31 is a lock cylinder 28 with a keyhole 29 (FIG. 1), both of which are of conventional construction.

In FIG. 2, the locking device 20 is shown gripping one pushbutton 30 of the array 24. Actually, the device 20 grips two pushbuttons simultaneously, but the second pushbutton is not visible in FIG. 2.

The housing 26 is dimensioned so that it fits into the spaces between adjacent keys, and can be used to cover any pair of pushbuttons in any of the columns of pushbuttons. This is illustrated by the showing of adjacent pushbuttons 32 and 34 in FIG. 2. Of course, if the pushbuttons in the horizontal rows are spaced the same as those in the columns, the lock also can be used to lock any two adjacent pushbuttons in a horizontal row.

GRIPPING STRUCTURE

The pushbutton 30 (and the other pushbutton hidden behind it) is gripped between the edge 45 of a hook-shaped portion 44 of a first gripping member 42, and the opposed edge 74 of the horizontal portion 52 of a second gripping member 53.

Now referring to FIGS. 3 and 4, as well as FIG. 2, the gripping member 42 is made of tempered spring steel and consists of a plate with two tabs bent to form hooked portions or "jaws" 44 to grip two different pushbuttons. Vertical tabs 64 extend downwardly to form legs which rest on horizontal portions 52 to support one side of the structure of the gripping member 42.

Another portion of the member 42 is bent upwardly to form a tab 48 to be used as a cam follower surface, as it will be explained in greater detail below. A cutout portion 58 is provided between the two jaws 44 so as to make the jaws independent from one another. Since the metal of which the member 42 is made is spring steel, the jaws 44 are relatively flexible, and each will deflect somewhat independently in order to accommodate pushbuttons of slightly different sizes. Thus, the lock will operate easily with pushbuttons whose sizes are not maintained within close tolerances.

A hole 60 (FIG. 3) is provided to accommodate the end of a key inserted into the lock and thus minimize the height of the lock device.

Now referring to FIG. 5 as well as FIG. 2, the other gripper member 53 is made out of sheet steel. It has two cutout portions 70 and 72 which are slightly larger than the tops of the pushbuttons to be locked. Thus, the cutouts 70 and 72 form apertures into which the pushbuttons protrude when the locking device is placed over them.

The rear edges 74 and 76 of the apertures 70 and 72 abut against one side of each pushbutton when it is being gripped. The opposite side is pressed against by the edge 44 of the other gripper member 42. Thus, the gripping forces are applied on opposite sides of the pushbutton.

The gripping forces are applied in a single plane; that is, the edges 74 and 45 are in the same plane. Moreover, this plane is as close as possible to the base of the pushbutton 30. This is accomplished by providing the wide slots 78 and 80 in the bottom of member 53. These slots are slightly wider than the jaws 44. The jaws 44 are recessed slightly as at 47 in order to provide a ledge for the member 42 to rest upon the member 53, with the jaws as low as possible.

The member 53 has upwardly-bent portions forming vertical side and end walls 66 which fit snugly into a cavity in the bottom of the housing 25. Cutout areas 68 are provided on three sides of the member 53 at the corners, and cutout areas 78 and 80 provide similar recesses in the corner of the forth side of the member 53. These recesses receive plastic material of the housing which is forced into the recesses by ultra-sonic "staking" (deforming) so as to hold the member 53 in the housing. Member 53 in turn holds the rest of the components of the lock device in the housing.

Of course, the member 53 can be mounted in the housing 26 by any of a number of well-known alternative means. For example, if the housing 25 is made of metal, the member 53 can be secured by a number of known threaded fasteners or by welding, or by mechanical staking.

The gripping member 42 is slidable horizontally relative to the fixed member 53, first to the right in order to provide an opening for the insertion of the pushbuttons, and then to the left to grip the pushbuttons after they have entered apertures 70 and 72.

Referring again to FIG. 2, a bow-shaped spring 54 is fitted between the portion 64 of the member 42, and one side wall of the member 53. This spring urges the member 42 to the right to open the jaws of the locking device to receive a pushbutton to be locked.

The gripping action of the locking device is provided by means of a cam 50 which is attached to the lock cylinder 28. The cam 50 engages the upstanding tab 48 of the gripping member 42 to push it to the left, as shown in FIG. 2, to force the jaws 44 against the pushbuttons and lock them in place.

FIG. 7 is a plan view of the cam 50 which shows its shape. The cam 50 has a first half 82 which is of relatively large diameter. This half is a bearing portion of the cam which makes a sliding fit with the interior recess of the housing 25 at the right hand edge of the cam 50 as shown in FIG. 2. Thus, the housing provides a bearing surface against which the cam can press when applying locking force to the tab 48. This helps to hold the pushbuttons securely.

A portion 84 of reduced diameter is the unlocking portion of the cam. That is, when the portion 84 is adjacent the tab 48, the pushbutton is not gripped. The diameter of the cam increases gradually from the zone 84 to the point 88. When a key is inserted into the lock and the cam is rotated in the direction of the arrow 85 (clockwise), the diameter of the cam contacting the tab or follower 48 gets larger until the point 88 reaches the tab 48, at which point the cam applies maximum gripping force to the jaws 44 and 52. When the key is turned counterclockwise to unlock the lock, the pushbutton is released when the portion 84 reaches the tab 48, and the spring 54 pushes member 42 to the right to open the jaws of the locking device. The edges 90 and 92 on the cam serve as stops.

The portions of the gripping member 42 which form the jaws 44 are in effect, spring arms. The gripping forces for the jaws are applied at the bases 43 of those spring arms. This insures that there will be some flexibility in the gripping of the pushbutton and is highly advantageous in that it allows the jaws 44 to adapt to small variations in the sizes of the pushbuttons and avoids the need for relatively close manufacturing tolerances for the gripping mechanism.

Another advantage of the locking device 20 is that the pushbuttons are gripped at a location which is as close to the base of each pushbutton as possible. In fact, the portions 44 and 52 rest upon the rim 56 (FIG. 2) surrounding each pushbutton. It should be noted that the bottom portion 40 (FIG. 2) of each pushbutton 30 is enlarged so that it will not pull through the pushbutton housing 37.

Another advantage of the invention is that, because the gripping jaws 44 are resilient, they provide a substantial amount of gripping force and yet do not grip the pushbuttons so hard that they would cause them to be damaged by a forceful attempt to remove the locking device. For example, if a screwdriver were inserted under the housing 25 and a considerable amount of force applied, the locking device 20 could be pried off, without pulling loose or damaging any of the pushbuttons. At first blush, this might seem to be a disadvantage. However, often it is sufficient to merely provide a deterrent to unauthorized persons usng the pushbuttons. The present invention provides such a deterrent, but without subjecting the telephone set to damage by those who might try to forcibly defeat the locking device. Moreover, once the lock has been pried off, it is nearly impossible to replace it on the pushbuttons without a key, because the jaws 44 and 52 are too close together, and the pushbutton has too little resistance to downward pressure to allow the closed locking device to be pressed onto the pushbuttons. This means that the defeat of the lock can be detected easily, which can be an added deterrent to attempts to defeat the lock.

The locking device 20 is designed to lock two pushbuttons. In the example shown in FIG. 1, the two keys are the "9" key and the lower right-hand corner key. In many business organizations, it is desired to lock only those pushbuttons in order to prevent the employees from making outside calls. The locking of only those two pushbuttons leaves the other free for making calls within the business establishment.

FULL PANEL LOCK

If access to all of the pushbuttons is to be denied, the form of the invention shown in FIGS. 8 through 10 can be used. The device shown in these figures has a cover 92 which covers all of the pushbuttons except where three holes 98, 100 and 102 are located to give access to the specific pushbuttons beneath them. Of course, if desired, the cover 92 can be provided without any holes whatsoever so as to deny access to all of the pushbuttons.

In the bottom plan view of the cover 92 shown in FIG. 10, the bottom construction of the cover is shown. Webs are provided in the bottom cavity of the cover 92 so as to form cavities 94 for the pushbuttons while strengthening the cover.

A central cavity 96 is provided for housing the mechanism shown in FIG. 2. This locking mechanism grips the two center pushbuttons (the 5 and the 8 pushbuttons on the telephone 22 of FIG. 1) and thus secures the whole cover in place.

SINGLE-BUTTON LOCK

An alternative embodiment of the invention is illustrated in FIGS. 11 and 12. This embodiment is designed to be used when only one pushbutton is to be gripped. This might be the case either when only one pushbutton is to be locked, or when more than one pushbutton is to be locked by means of a cover such as that shown in FIGS. 8 and 10. In other words, the locking device shown in FIGS. 11 and 12 can be used in a single-button lock, or in half of the center cavity 96 instead of the mechanism shown in FIG. 2.

The locking mechanism shown in FIGS. 11 and 12 includes a housing 114 in which is located a movable gripping member 104 and a stationary gripping member 118.

The movable gripping member 104 consists of a square-shaped piece of flat sheet spring steel bent to form two hooked tabs or jaws 106 and 108 on adjacent sides of the square shape. At one corner of the member 104 is an upstanding tab portion 110 which is bent over to form a downwardly-extending return spring portion 112. The spring portion 112 abuts against a portion 116 of the housing which fills one of the corners of the housing 114 (see FIG. 12). The spring 112 pushes the member 104 diagonally to the left to return it to an unlocking position.

The cam 50 is the same as the cam shown in FIG. 2. Its cam surface is shown in FIG. 11 in dashed outline engaging the upstanding tab 110. The cam 50 pushes the member 104 diagonally to the right to cause the jaws 106 and 108 to press against two adjacent sides of the pushbutton 30.

The stationary gripping member 118 has a pair of projecting edges 120 and 122 which are positioned directly opposite the edges of the jaws 108 and 106, respectively. Thus, when the cam 50 applies force to the tab 110, this moves the member 104 diagonally to the right and causes all four edges 106, 108, 120 and 122 to press against the pushbutton and grip it on all four sides.

Cutout portions 124 similar to the cutout portions 68 in FIG. 5 are provided for the purpose of receiving material from the housing forced into them in order to secure the member 118 in place.

The remainder of the locking structure is the same as shown in FIG. 2 and is not illustrated in FIGS. 11 or 12 for the sake of simplicity in the drawings.

As it is shown in FIG. 12, the housing 114 has indentations on four sides into which up to four adjacent pushbuttons fit. The engagement of the adjacent pushbuttons in the indentations secures the housing against attempts to twist it off, and prevents rotation due to twisting of the key to lock or unlock the device. The use of such indentations also permits the corners of the housing to extend outwardly further to give greater lateral stability.

The structure shown in FIGS. 11 and 12 is especially desirable since it can be used very efficiently to lock one pushbutton; or it can be used to lock a whole panel of pushbuttons by gripping only one button.

REVERSE-BEND GRIPPERS

FIG. 13 shows an alternative embodiment of the gripper portions 44 and 52 used in the lock. In this embodiment, the ends 44 and 52 have been bent upwardly so as to form a substantial acute angle with the vertical side-walls of the pushbutton 30. This has an advantage in that when it is attempted to pry the lock off, the tips 49 and 57 of the elements 52 and 44 will dig more deeply into the material of the pushbutton, due to the fact that the edges of the element 44 and 52 tend to rotate about an axis which is located at a distance from the pushbutton which is less than the length of the portion 52 or 44. This has the effect of greatly increasing the holding power of the locking device.

The tips 49 and 57 of the ends 44 and 52 are bent downwardly so that the edges are approximately parallel to the sides of the pushbutton. Furthermore, the gripping members preferably are formed by stamping for best economy, and stamping usually leaves a burr along one side of the cut edges. Preferably, this burr should be on each of the upper edges of the tips 49 and 57 so that, as the cover is urged upwardly, the burrs will dig into the plastic material of the pushbutton.

Various techniques can be used for forming the housing 25. For example, injection molding of plastic materials, or die casting of metals can be used.

The above description of the invention is intended to be illustrative and not limiting. Various changes or modifications in the embodiments described may occur to those skilled in the art and these can be made without departing from the spirit or scope of the invention. For example, although square pushbuttons have been shown and described above, it should be clear that the invention also can be used with round or cylindrical pushbuttons simply by making the jaws or edges of the gripping members curved to conform to the curvature of the outside surfaces of the pushbutton. Similarly, the lock which drives the cam can be of any desirable type. However, a key-operated lock is preferred, since the key can be used as a type of handle in order to operate the pushbutton gripping mechanism.

I claim:

1. A pushbutton locking device comprising a housing, gripping means in said housing drivable for gripping at least two opposite sides of at least one pushbutton in an array of side-by-side pushbuttons, each of which is actuatable by being pushed in a given direction, said housing being adapted to cover at least each pushbutton which is gripped, drive means having a driving element disposed above and overlying said gripping means and operable for driving said gripping means into engagement with said sides of said one pushbutton, and lock means for selectively locking said drive means to prevent disengagement of said gripping means from said pushbutton, said lock means being mounted substantially within the space directly above that defined by the nearest edges of the pushbuttons adjacent the pushbutton or pushbuttons gripped.

2. A device as in claim 1 in which said drive means is mounted in said space, and said driving element includes drive engagement means extending in said given direction between said drive means and said gripping means to effect the engagement of said gripping means with said drive means.

3. A device as in claim 1 in which said cover is adapted to cover the entire pushbutton array.

4. A device as in claim 1 including a telephone, and in which said pushbuttons of said array extend upwardly through a panel on said telephone.

5. A device as in claim 1 in which said gripping means includes first and second gripping members movable towards and away from one another, said drive means comprising means operable for urging said gripping members towards one another to grip said pushbutton.

6. A device as in claim 5 including resilient means for urging said gripping members away from one another.

7. A device as in claim 5 in which said lock means includes a key-operable lock cylinder, said drive means includes a cam driven by said lock cylinder, said cam being rotatable in a plane transverse to said given direction, one of said gripping members having a cam follower surface positioned to be engaged by said cam when said cam is rotated.

8. A device as in claim 5 in which said first gripping member has one edge positioned to engage one side of said pushbutton, a spring arm supporting said one edge, said drive means including means for applying a force adjacent the base of said spring arm to urge said arm and said one edge towards said pushbutton in order to resiliently bias said one edge and enable it to grip pushbuttons of different dimensions.

9. A device as in claim 1 which is adapted to grip a plurality of pushbuttons arranged in a row, said gripping means comprising a pair of elongated gripper members, one on each side of said row of pushbuttons, each gripper being adapted to engage one side of each pushbutton in said row and having a separate projection for engaging each of said pushbuttons.

10. A device as in claim 1 in which said gripping means includes at least one spring arm with a bent end forming a gripping edge, said bent end extending upwardly at an acute angle to one side of said pushbutton so as to cause the force thrusting said gripping edge towards said pushbutton to increase when said housing is lifted while locked.

11. A device as in claim 4 in which said cover has access holes over pre-selected ones of said pushbuttons.

12. A pushbutton locking device comprising a housing, gripping means in said housing drivable for gripping at least two opposite sides of at least one pushbutton in an array of side-by-side pushbuttons, each of which is actuatable by being pushed in a given direction, said housing being adapted to cover at least each pushbutton which is gripped, and to fit around the sides of said one pushbutton between adjacent pushbuttons in said pushbutton array when there are adjacent pushbuttons on all sides of said one pushbutton, drive means operable for driving said gripping means into engagement with said sides of said one pushbutton, and lock means for selectively locking said drive means to prevent disengagement of said gripping means from said pushbutton, said locking means being mounted substantially within the space directly above that defined by the nearest edges of the pushbuttons adjacent the pushbutton or pushbuttons gripped.

13. A pushbutton locking device comprising a housing, gripping means in said housing drivable for gripping at least two opposite sides of at least one pushbutton in an array of side-by-side pushbuttons, each of which is actuatable by being pushed in a given direction, said gripping means including first and second gripping members movable towards and away from one another, said first gripping member being secured in said housing and having an aperture for receiving said pushbutton, one lateral edge of said aperture serving as a gripping edge to engage and grip said pushbutton, said second gripping member having one edge engaging one side of said pushbutton, said housing having an upper end and a lower end with a pushbutton-receiving opening therein, said first gripping member secured adjacent said lower end in covering relationship to said opening to hold said second gripping member in said housing, said housing being adapted to cover at least each pushbutton which is gripped, drive means including means operable for urging said gripping members towards one another to grip said pushbutton, and lock means for selectively locking said drive means to prevent disengagement of said gripping means from said pushbutton, said lock means being mounted substantially within the space directly above that defined by the nearest edges of the pushbuttons adjacent the pushbutton or pushbuttons gripped.

14. A pushbutton locking device comprising a housing, gripping means in said housing drivable for gripping four opposite sides of at least one pushbutton in an array of side-by-side pushbuttons, each of which is actuatable by being pushed in a given direction, said housing being adapted to cover at least each pushbutton which is gripped, drive means operable for driving said gripping means into engagement with said sides of said one pushbutton, and lock means for selectively locking said drive means to prevent disengagement of said gripping means from said pushbutton, said lock means being mounted substantially within the space directly above that defined by the nearest edges of the pushbuttons adjacent the pushbutton or pushbuttons gripped.

15. A device as in claim 14 in which said gripping means includes a first gripper member forming an aperture for receiving said pushbutton, said aperture including two edge portions adjacent said pushbutton, and a second gripper member having two edges for engaging two sides of said pushbutton opposite the sides engaged by said edge portions, said second member being movable relative to said first member to selectively grip and release said pushbutton.

16. A pushbutton locking device comprising a housing, gripping means in said housing drivable for gripping at least four opposite sides of a pushbutton, said housing being adapted to cover said pushbutton, drive means operable for driving said gripping means into engagement with said sides of said pushbutton, lock means for selectively locking said drive means to prevent disengagement of said gripping means from said pushbutton, said lock means being mounted above said pushbutton, said gripping means including a first gripper member forming an aperture for receiving said pushbutton, said aperture including two edge portions adjacent said pushbutton, and a second gripper member having two edges for engaging two sides of said pushbutton opposite the sides engaged by said edge portions, said second member being movable relative to said first member to selectively grip and release said pushbutton, said second member being a generally rectangular plate with hook-shaped projections on two adjacent sides, an upstanding tab at the corner of said plate opposite the corner between said projections, and cam means for engaging said tab to move said plate diagonally to lock said pushbutton.

17. A device as in claim 16 in which said tab is bent over and is made of resilient material and engages said housing so as to be returned to its disengaging position when said plate is released by said cam.

18. A lock device to prevent access to selected pushbuttons on a pushbutton telephone, said device comprising a housing for enclosing at least one of said pushbuttons, a key-operated lock in said housing above said pushbutton, gripper means movable towards and away from a pushbutton to grip and release it, means disposed above and overlying said gripper means for moving said gripper means towards said pushbutton to grip it when said lock is turned for locking, means for urging said gripper means away from said pushbutton when said lock is turned for unlocking, said housing being adapted to fit around the sides of said pushbutton substantially without overlapping any adjacent pushbuttons when the pushbutton gripped is surrounded by adjacent pushbuttons.

19. A device as in claim 18 in which said housing is adapted to cover all of the pushbuttons on said telephone, said gripper means being adapted to grip at least one of the centrally-located pushbuttons in the pushbutton array on said telephone to hold said cover in place.

* * * * *